UNITED STATES PATENT OFFICE 2,629,555

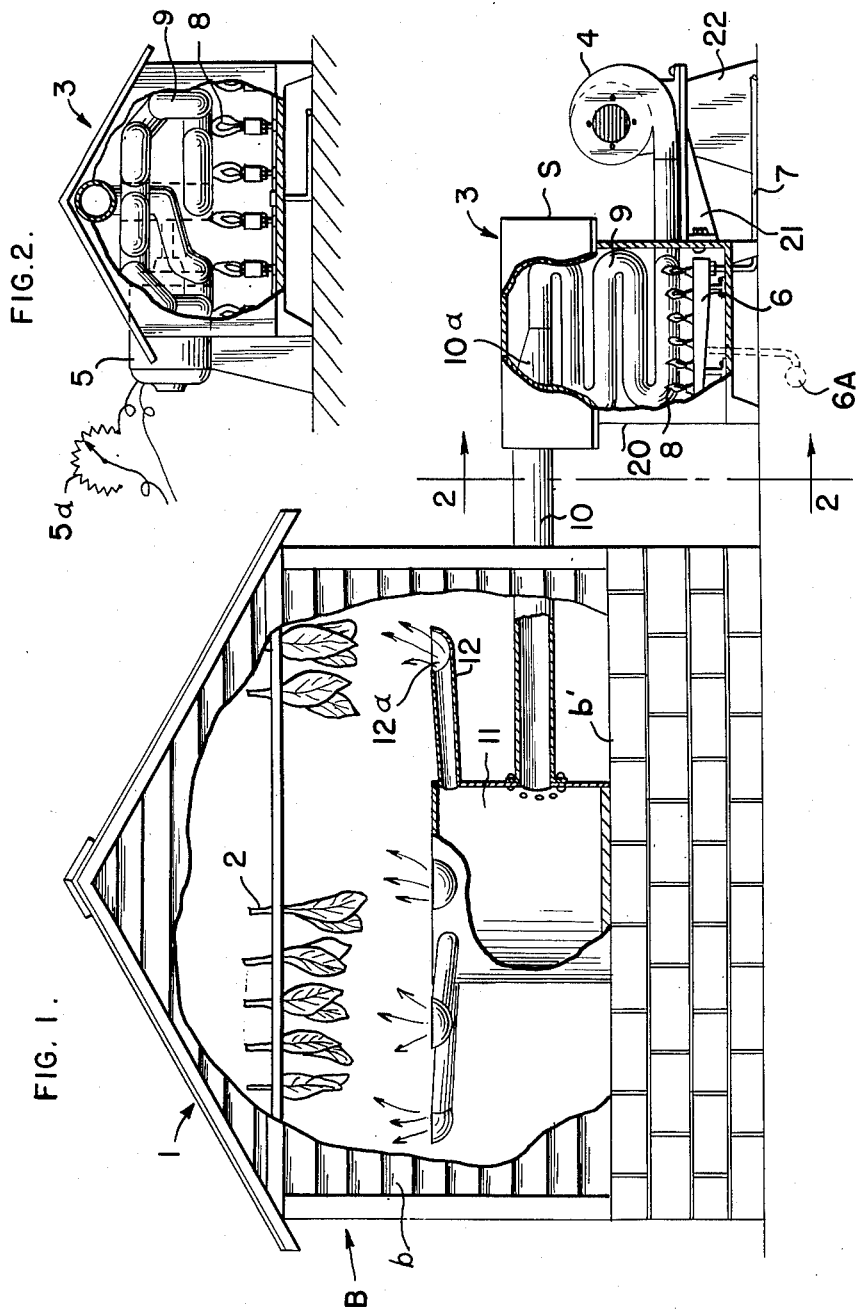

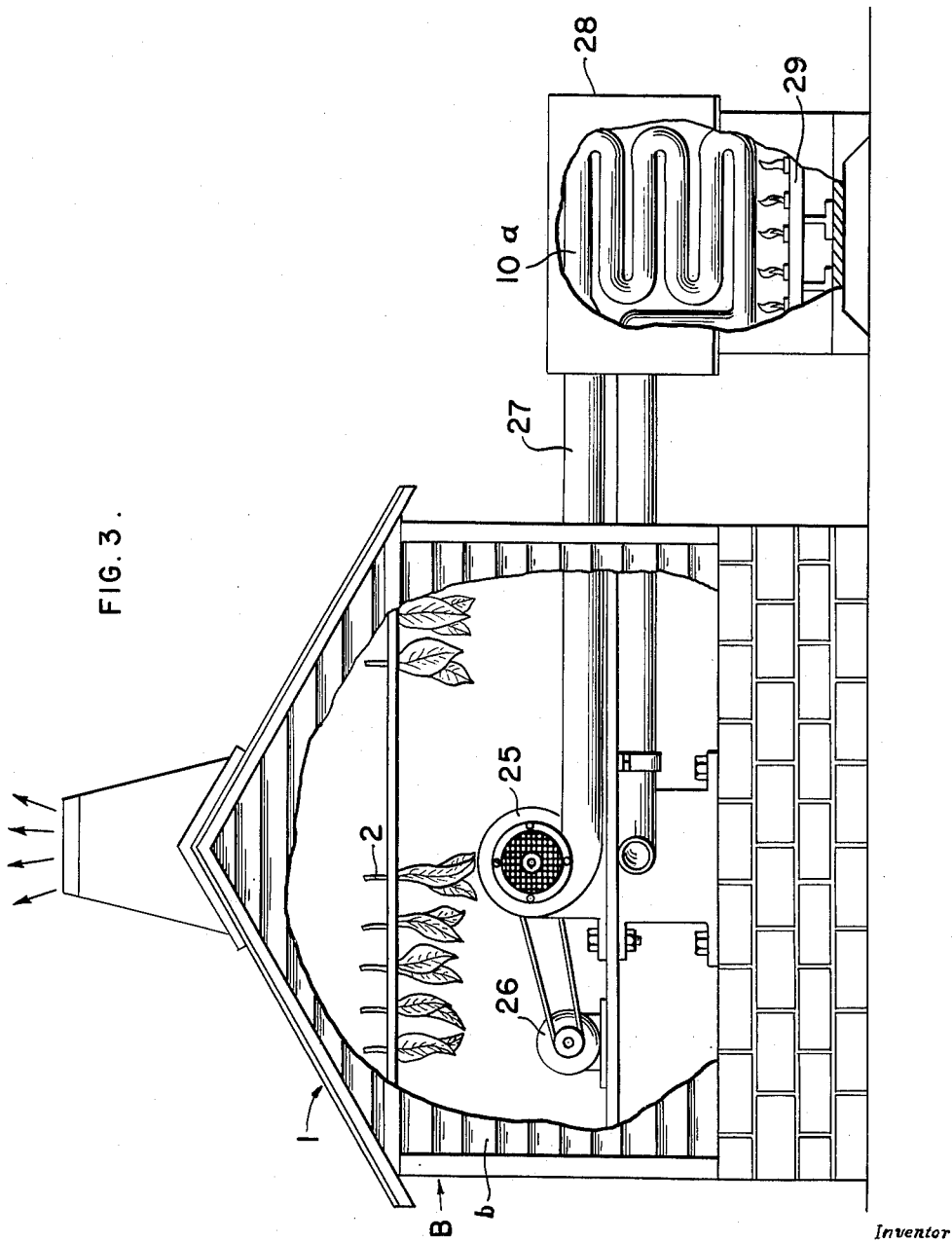

CURING OF GREEN TOBACCO LEAVES

James E. Jones, Farmville, N. C., assignor of forty-five per cent to T. C. Hughes, Green County, N. C.

Application March 14, 1950, Serial No. 149,500

4 Claims. (Cl. 237—53)

This invention pertains to the curing of green tobacco leaves and relates more particularly to the supply of the air used in the curing process and the control of such supply.

The curing of green tobacco leaves has become more or less standard as to the general regimen involved, having been practiced for many years. The leaves after being taken from the stalk are suspended from poles, the latter then being mounted horizontally within the tobacco curing bar in spaced relation so that the depending leaves can be given the desired curing treatment. The barns are generally of typical type and generally include controllable side louvres, sometimes including a controllable opening in the roof, these aiding in providing the proper control of the circulating heated air which is used in providing the treatment.

The curing process generally requires a period of approximately 30 days, since the leaves, when cut, are heavily laden with a moisture content (estimated at approximately 80% by weight of the green leaves) and which is not uniformly distributed, a condition which, with the shape of the leaf, tends to make the curing process one requiring extremely careful attention if the desired color and texture are to be obtained, this being especially true of the first seven or eight days of the treatment. During this early period, much of the moisture is removed, and this must be done in a very careful manner to avoid development of rotting or "pole sweat" conditions, a possibility present between the second and sixth days, due to the presence of heavy moisture conditions while the leaves are being dried and contain many dead cells, conditions which can promote the growth of pole sweat spores in the dead cells. Even meteorological conditions can affect the proper and desired progression of the treatment, a reason why the curing barns are generally provided with controllable louvres, etc., designed to reduce the effect of the conditions as far as possible.

While there is more or less similarity in the general regimen used in the curing treatment, the actual regimen used depends more or less upon the characteristics of the apparatus employed, the manner in which the air is distributed, etc. In some installations, even the barns are especially equipped for producing a multiplicity of variations as to temperatures, air movements, etc., such installations being very expensive in initial cost and requiring exceedingly careful attention in practicing the regimen. The simpler forms of installations rely more particularly upon the louvres for control, the heated air being provided by the use of charcoal pots placed at various points on the floor of the barn. This practice, while permitting the development of the regimen, does not provide for maximum control conditions during the development of the regimen, since dependence must be placed upon the louvre manipulation, and even reach to a need for varying the number of pots made active for the purpose of controlling the air temperature. As a result, the cured product generally does not approach the finished value that is secured by the use of the elaborate and expensive apparatus, the result being more in the direction of the "hit or miss" type, dependent upon the nature and carefulness of the attention given to the limited facilities present as well as the skill of the operator.

The present invention is designed to take a position between the two types of apparatus referred to, as to cost and efficiency. It provides many of the control characteristics of the expensive type, produced in a different way, so that it is possible to provide the needed control in a simple manner, doing this with efficiency and producing a product of values approaching or equal to those secured with the expensive installations. It practices the regimen in a different manner, in some respects. For instance, some of the elaborate types re-use the air by placing the air supply source within the barn itself, while the air supply used in the present invention is located externally of the barn, thus avoiding the recirculation of the moisture laden air from within the curing chamber. During the later stages of the regimen, when the leaves have become dry and the moisture is comparatively low, the addition of moisture to the air supply may be of advantage, a condition which can be readily met by the addition of a simple form of aspirator to the flow path for the heated air.

A dominant feature of the present invention is the control of the delivery of the heated air and of the temperature of such air to the interior of the barn, together with the manner in which such control is obtained, the air distribution being of similar temperature at each of the delivery points, and with the temperature values as well as the velocity of delivery generally controlled from the external supply station. The connections between the supply station and the delivery points include a tempering chamber within the barn active to assure such similarity in delivery of the heated air for service, the structural arrangements being such as to assure efficiency in service and yet permit of needed variations in character of delivery at will and with a minimum of difficulty.

The structural assemblage is simple in character, efficient in operative service, and comparatively inexpensive, these conditions being obtained through the manner in which the air is moved from the supply station to the points of delivery.

To these and other ends, therefore, the nature of which will be more clearly defined as the invention is hereinafter disclosed, said invention consists in the improved constructions and combinations of elements and their arrangement, as hereinafter fully described in the following specification, illustrated in the accompanying drawing, and more particularly described in the appended claims.

In the accompanying drawings, in which similar reference characters indicate similar parts in each of the views, Figure 1 is a view in elevation of a curing barn and its separate supply station, parts being shown as partly broken away to show internal arrangements, these having elements of the air supply equipment shown partly in elevation and partly in section, the whole presenting a somewhat diagrammatic presentation of a preferred form of tobacco curing system.

Fig. 2 is a detail elevation, with parts broken away and others in section, of the air supply station for the curing barn, the view being taken on line 2—2 of Fig. 1, thus presenting a view at right angles to the showing of the station in Fig. 1.

Fig. 3 is a view of a modified form of the invention.

Since the invention pertains more particularly to the air supply system, the showing of the curing barn, indicated at B, is more or less typical or representative of a structure of any preferred design and dimensions, with the interior equipped for the mounting of the leaf carrying poles or rods of any desired number and positions, the barn having any desired louvre arrangements carried by its side walls, these being shown diagrammatically at b. If desired, the roof may be equipped with ventilators. In other words, the barn per se is assumed to be a typical curing barn and carries a floor b', preferably raised with respect to the ground surface to meet certain conditions presently referred to.

Likewise, the housing for the air supply station S may be of any preferred form, being located external of and spaced from a side of the barn B, the housing being located on the ground surface outside of the barn. This arrangement of barn and station tends to protect the barn from fire dangers, the station being equipped with a battery or batteries of burners for the purpose of heating the air for delivery to the barn.

Referring first to the air supply station S, 6 indicates a battery of burners mounted within the housing above the floor thereof, a suitable number of burners being mounted in the battery and having a suitable source of supply of fuel through pipe 7. The battery may be equipped with suitable individual and/or collective controls, indicated diagrammatically at 8, and not shown in detail since they are of well known type. If desired, more than a single battery of burners may be employed. The burners are used primarily for heating the air within the housing section 20 of the station, the latter being of comparatively small dimensions. In addition, the burners may also be positioned relative to portions of the air conduit 9, presently described in detail, a section of which traverses the station within the housing and which extends from the fan or blower unit external of the housing to and into the barn B for delivery to a tempering chamber 11 therein, also presently described in detail.

The portion of the conduit 9 within the housing is arranged to present somewhat of a serpentine or sinuous course within the housing, the course having any preferred arrangement, but generally includes connected back and forth formations extending in horizontal and/or vertical planes so connected as to form a continuous air travel path which extends on different levels within the housing, as indicated diagrammatically in Figs. 1 and 2, the conduit entering the housing on the lower level, and leaving it on an upper level, with the conduit length within the housing such as to cause the air traversing the conduit to remain within the housing for a somewhat prolonged period. The portion of the conduit which leaves the top zone of the housing is of increased diameter, as indicated in Fig. 1, this portion being connected with the serpentine formation (of materially less diameter) by a tapering portion 10a positioned in the upper level of the course within the housing adjacent the point of emergence of the conduit. As a result, the conduit is so arranged that the air traversing the heating zone can be more rapidly heated by reason of the smaller cross section of the conduit within this zone, and permitted to expand to some extent just prior to leaving the housing.

Fan 4 is a motor driven unit, motor 5 providing the power for driving the fan. The motor is of any preferred type, but may, and preferably is, of a type which permits speed changes in its operation, thus being capable of driving the fan at different speeds; resistor 5a is shown diagrammatically to indicate this preference. The fan 4 itself is located outside of the housing 20, the fan unit being supported in suitable manner, as by a bracket 21 secured to a side of the housing, the motor being carried by a support 22. The fan thus takes its air external of both the curing barn B and the housing 20, and delivers it under pressure from the fan outlet to the entrance end of conduit 9.

As will be understood, air from the fan unit 4 enters and traverses the portion of the conduit system located in housing 20, and is subject to the heat application provided to the exterior of the conduit from the flames 8 of the battery or batteries of burners. As is apparent, there is a time element involved in connection with the length of time required for an air increment to travel the length of the serpentine pathway within the housing 20, so that the ability to control the speed of motor and fan unit operation can be used to a more or less limited extent in determining the temperature of the air emerging from the conduit portion within the housing. The higher the speed of fan rotation, the shorter the length of time required by the increment in traversing this portion of the conduit in which it is being subject to the heating action, since the higher the speed the greater is the volume of air introduced into the conduit per unit of time with consequent increase in the rate of advance of the increment within the conduit. If there be resistance to free advance of the increment, the increase of fan speed would additionally increase the pressure within the conduit. Within the supply station zone of the conduit, no resistance to advance of the increment is present. In fact, the enlargement of the cross-sectional area of the conduit as it leaves the station could tend to reduce the rate of advance of an increment at such time, or, if any pressure increase within the station, due to resistance at any part of the air travel path, such dimensional increase would tend to reduce the pressure value.

Within the curing barn itself, an air tempering chamber, indicated at 11, is located preferably in a central zone, the bottom wall of the chamber resting on the floor of the barn. The side walls of the chamber are of suitable contour, preferably cylindrical, with the chamber diameter dimension of considerable magnitude as is the vertical height of such side walls, the top wall closing the top of the chamber. Since the conduit 10 extends to and opens into the lower zone of the chamber, the floor b' of the barn may be elevated with respect to the supply station, as shown, or a raised floor be provided for supporting the chamber. The side walls of the upper zone of the chamber are provided with a plurality of tubular arms 12 radiating outward from the walls in spaced relation, with each arm in open communication with the interior top zone of the chamber, each arm having its outer end formed with an opening at the top of the arm, such opening leading into a shallow pan-like formation with outwardly-flaring form, indicated at 12a, opening upward. The length of the arms is such as to place the pan outlets in a marginal zone of the barn.

The chamber 11 forms an important feature of the air delivery path used in the curing regimen. It is so dimensioned as to contain a comparatively large volume of air to always assure an amount to properly supply each of the radiating outlets concurrently, and since its content is being constantly replenished by the air supplied from supply station S, an adequate supply of air for the curing regimen is always available.

The chamber is of especial value as an air tempering means. As will be understood, the volume of air within the chamber is of relatively large amount as compared with the volume present in the area of a cross section of conduit 10, so that the air which is being supplied from the conduit under pressure, as above explained, must actually penetrate the volume of the lower zone of the chamber, the result being that such entering air serves to create turbulence agitation within the chamber lower zone, the effect of which reaches throughout the chamber. Since the chamber air itself is air previously introduced from the conduit 10, and which has lost some of its heat through its remoteness from the supply station, the entrance of the heated air from the conduit, and the agitation turbulence thereby produced, causes such entering air to become admixed with the residual air due to the agitation, thus increasing the temperature of the air in the top zone of the chamber, which forms the supply for the arms 12. Since the air temperature within the arms is thus varied from that of the residual air of the chamber and also the air entering the chamber, such arm air becomes a tempered air, the temperature value of which depends primarily upon the temperature of the entering air. By controlling the temperature of the latter through supply station activity, it becomes possible to provide air of uniform temperatures values at each of the pan outlets 12a, and to vary or maintain such values by controlling the conditions within the supply station.

For instance, if the fan is rotated at high speed, the air entering conduit 9 will advance through the conduit at high speed and thus be subjected to the heating action for a materially shorter period with consequent lower temperature values and lower temperature delivery to chamber 11. However, such air will be delivered to the chamber under higher pressure conditions, thus providing a greater degree of turbulence within the chamber and more rapid admixture of the air with the residual air and at the same time discharge the tempered air from the upper zone of the chamber under higher speed conditions. Such conditions are advantageous when the system is made active and it is desired to change the temperature value of the residual air in the chamber from the normal atmospheric temperature to higher value, the turbulence action serving to rapidly admix the air and discharge it from the chamber, and thereby tending to raise the temperature of the residual air.

After a short period, the speed of the fan is reduced, thus reducing the rate of advance of the air through the conduit, with consequent increase in temperature of the advancing air through the increase in length of time required to traverse the housed portion of the conduit and at the same time slightly reducing the pressure. Hence, the air entering chamber 11 will be at higher temperature but lesser pressure, the result being that the violence of turbulence will be reduced with consequent slower rate of admixture with the residual air as well as a lowering of the rate of discharge. Hence, by controlling the speed of rotation of the fan, it is possible to control various features of the operation of the system. These are control of the temperature of the air traversing the conduit, as well as its pressure, control of the tempered value of the air within the upper zone of the chamber through the turbulence variations, as well as the control of the rate of discharge of the tempered air at the outlet ends of the system.

As will be understood, variations in the temperature of the tempered air in the upper zone of chamber 11 are less pronounced than those within the conduit, since the degree of turbulence within the chamber decreases as the temperature values within the conduit increase, due to decrease in fan speed, thus requiring a greater time period for admixture and a greater time length within the chamber, an increase which can permit slight cooling action within the chamber itself. As a result, it is possible to secure slight variations in temperature of the air delivered from the mouths of the arms through variations in the fan speed, it being understood, of course, that when the fan is operating at constant speed, the delivered air temperatures will also be substantially constant since the heated air delivery from the conduit into the chamber is at constant temperature and continuous.

The advantage of the system in the matter of the delivery lies in the fact that the variations in fan speed need not accord with the close variations in temperature of the discharging air, since the time length required for air travel through the housed zone of the conduit, and the degree of turbulence within the chamber and its effect within the chamber, are factors which are separately controlling in developing the temperature variations in the air delivered from the arms 12.

Hence, the temperature variations in the air delivered to the chamber from conduit 10 are greater than those of the air delivered from the arms, thus not requiring close adjustment in the fan speeds.

In this respect there is no need for reliance upon the adjustment of the burners, the latter adjustments being used only where the curing regimen requires a major difference in the heat values of the discharging air. Minor differences are provided by the control of the fan speed. This major change at the burners permits the degree of turbulence to be maintained in the presence of a major variation in the temperature of the air delivered into the chamber, thus tending to provide a flexibility in temperature development. For example, if the progression of the curing regimen requires minor temperature changes produced by fan speed variations within a definite range, it is possible, by burner adjustment to produce a major change and permit the fan speed variations to operate within the new range in the same manner so that the burner adjustment need not be based on any particular temperature value, since the fan speed variations can correct any over or under adjustment of the burners to produce the desired temperature conditions of the air delivered from the arms 12.

The modified construction disclosed in Fig. 3 positions a fan 25 controlled by motor 26 within the barn enclosure as distinguished from the Fig. 1 construction where the fan is located external of the barn enclosure. In such modification, a conduit 27 leads from the fan 25 to a housing 28 which contains a battery of burners 29 with controls for both the fan and the burners similar to the construction disclosed in Fig. 1. The portion of the conduit within the housing 28 is arranged to present somewhat a serpentine or sinuous course within the housing over the burners similar to the construction disclosed in Fig. 1. The outlet end of such conduit is extended externally of the housing 28 and further extended into the barn enclosure for the discharge of its contents in the manner indicated in Fig. 1 by the use of the tempering chamber, the specific details of which are omitted in Fig. 3 to avoid confusion. In practice, the fan 25 and motor 26 will be positioned at some point within the barn remote from the tempering chamber with conduit 27 leading therefrom, the position of fan and motor being such as to set up a circulation characteristic within the barn, the heated air discharged from the arms of the tempering chamber rising within the barn, the motor driven fan, remote from the upper region of the barn withdrawing air from the lower regions and thus setting up the circulation therein. In this manner any moisture laden air produced by the curing action is withdrawn and sent through the external heater and returned through the tempering chamber.

The particular curing regimen which may be required will depend more or less upon the characteristics of the tobacco leaves being cured. However, the flexibility in the control of the air heating system above described permits the system to operate efficiently and with simplicity under all expected conditions. Since the air supplied is constantly of external source, it will be understod that the air supply is not affected by the conditions within the curing barn. For instance, if the progression of the curing regimen so reduces the moisture within the barn as to effect the proper curing action, the external section of conduit 10 may be equipped with a suitable apparatus for delivering heated water in spray form within the conduit, or such spray or other form of delivery may be introduced into the interior of the curing barn itself.

While I have herein shown and described a preferred assemblage for the purpose indicated, it is obvious that changes and/or modifications therein may be found desirable or essential in meeting the exigencies of service or the desires of an individual user, and I, therefore, reserve the right to make any such changes and/or modifications as may be deemed desirable or essential insofar as the same may fall within the spirit and scope of the invention as expressed in the accompanying claims.

I claim:

1. A tobacco barn heating system comprising an air heating unit external of the barn, said unit having an air conduit traversing the unit in a sinuous path with the conduit positioned relative to a battery of controllable burners for heating the air content of the conduit; a motor driven fan for supplying air to the conduit with the motor controllable as to speed for controlling the rate of movement of the air through the conduit within the unit to thereby control the temperature of the air delivered by the unit; and an air tempering and distributing formation within the barn and in open communication with said conduit, said formation including an air tempering and distributing element positioned on the floor of the barn, said element being dimensioned relative to the discharge areas of the element to provide a chamber oversize as to volume of air required for distribution per unit of time to thereby produce a residual air content within the chamber in excess of that required for the distribution and into which residual content the conduit discharges, said element additionally having a plurality of radially extending tubular arms terminating in upwardly opening permanently open discharge ports individual to the arms and forming the sole discharge ports of the element, the inner ends of the arms being in open communication with the upper zone of the tempering chamber, said conduit opening into a side wall of said chamber within a lower zone thereof and remote from the outlets to the arms and forming the sole air supply for the element chamber, the dimensions of the chamber being such that the heated air from the conduit is delivered directly into the residual air of the chamber to create a turbulence condition therein to thereby temper the delivered air prior to its entry into the respective arms, whereby control of the motor speed is effective to control both the speed of delivery of air within the barn and the temperature of the air delivered for curing purposes.

2. An assemblage as in claim 1 characterized in that the motor is positioned in the vicinity of the air-heating unit to thereby permit the control to be exercised from outside the barn.

3. An assemblage as in claim 1 characterized in that a cross section of the air conduit within the air heating zone is of less areal dimensions than a similar section of the conduit beyond such heating zone, said conduit including a wall zone of increasing cross sectional dimensions positioned within the unit adjacent the position of exit of the conduit from the unit to thereby permit air expansion and rate of movement reduction prior to entry into the tempering chamber.

4. An assemblage as in claim 1 characterized in that the motor driven fan is positioned within the barn and operative to withdraw air from the barn interior to thereby create a circulation of the air delivered from the tempering chamber within the barn, the fan having a conduit connection with the conduit of the external heating unit to thereby subject the withdrawn air to a re-heating activity.

JAMES E. JONES.

REFERENCES CITED

The following references are of record in the file of this patent:

UNITED STATES PATENTS

| Number | Name | Date |
| --- | --- | --- |
| 316,170 | Platt et al. | Apr. 21, 1885 |
| 365,008 | Kernodle | June 14, 1887 |
| 646,218 | Hollingsworth | Mar. 27, 1900 |
| 648,259 | Hollingsworth | Apr. 24, 1900 |
| 1,224,560 | Needham et al. | May 1, 1917 |
| 2,095,186 | Gill | Oct. 5, 1937 |
| 2,286,206 | Jackson | June 16, 1942 |
| 2,343,346 | Touton | Mar. 7, 1944 |
| 2,533,092 | Chestnutt | Dec. 5, 1950 |